United States Patent
Puleo, Sr. et al.

(10) Patent No.: US 6,979,111 B2
(45) Date of Patent: Dec. 27, 2005

(54) FIBER OPTIC BASED LIGHT ORNAMENT

(75) Inventors: Salvatore J. Puleo, Sr., Watchung, NJ (US); Joseph A. Puleo, Watchung, NJ (US)

(73) Assignee: National Christmas Products, Inc., Cranford, NJ (US)

( * ) Notice: Subject to any disclaimer, the term of this patent is extended or adjusted under 35 U.S.C. 154(b) by 37 days.

(21) Appl. No.: 10/269,821

(22) Filed: Oct. 11, 2002

(65) Prior Publication Data

US 2004/0070992 A1    Apr. 15, 2004

(51) Int. Cl.[7] .................. F21W 131/30; F21V 8/00
(52) U.S. Cl. ............... 362/565; 362/555; 362/556; 362/564; 362/568
(58) Field of Search ................. 362/554, 555, 362/556, 568, 564, 565; 385/115; 65/429

(56) References Cited

U.S. PATENT DOCUMENTS

| | | | |
|---|---|---|---|
| 3,766,376 A * | 10/1973 | Sadacca et al. ............. 40/433 |
| 3,933,455 A * | 1/1976 | Chown ....................... 65/429 |
| 4,279,031 A | 7/1981 | Dostoomian | |
| 4,597,030 A | 6/1986 | Brody et al. | |
| 4,884,865 A | 12/1989 | Grise | |
| 4,932,747 A * | 6/1990 | Russell et al. ............. 385/115 |
| 5,021,928 A * | 6/1991 | Daniel ....................... 362/556 |
| 5,104,608 A | 4/1992 | Pickering | |
| 5,306,366 A | 4/1994 | Shattan | |
| 5,402,510 A * | 3/1995 | Kalonji et al. ............. 385/33 |
| 5,422,797 A * | 6/1995 | Shattan ...................... 362/123 |
| 5,558,422 A | 9/1996 | Sanford | |
| 5,639,157 A | 6/1997 | Yeh | |
| 5,702,170 A | 12/1997 | Broderick | |
| 5,820,248 A | 10/1998 | Ferguson | |
| 5,838,860 A * | 11/1998 | Kingstone et al. ......... 385/100 |
| 5,962,088 A | 10/1999 | Tanaka et al. | |
| 6,056,427 A | 5/2000 | Kao | |
| 6,304,694 B1 * | 10/2001 | Ford ........................... 385/33 |
| 6,386,746 B1 | 5/2002 | Kao | |
| 6,404,973 B1 | 6/2002 | Lee | |
| 6,431,740 B1 | 8/2002 | Puleo | |

* cited by examiner

*Primary Examiner*—Thomas M. Sember
*Assistant Examiner*—James W Cranson, Jr.
(74) *Attorney, Agent, or Firm*—Lerner, David, Littenberg, Krumholz & Mentlik, LLP

(57) ABSTRACT

A decorative light assembly comprises a plurality of optical fibers formed into a bundle having a length greater than one inch, the bundle having a first end for receiving light, and a second end that is fused for providing the received light as decorative illumination. The decorative light assembly is for use on, e.g., Christmas trees, windows, doors, etc.

8 Claims, 16 Drawing Sheets

FIG. 2
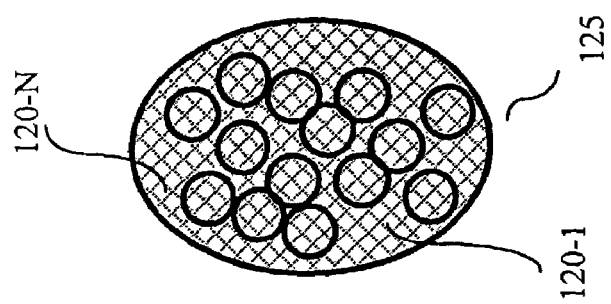
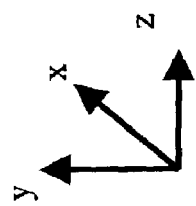

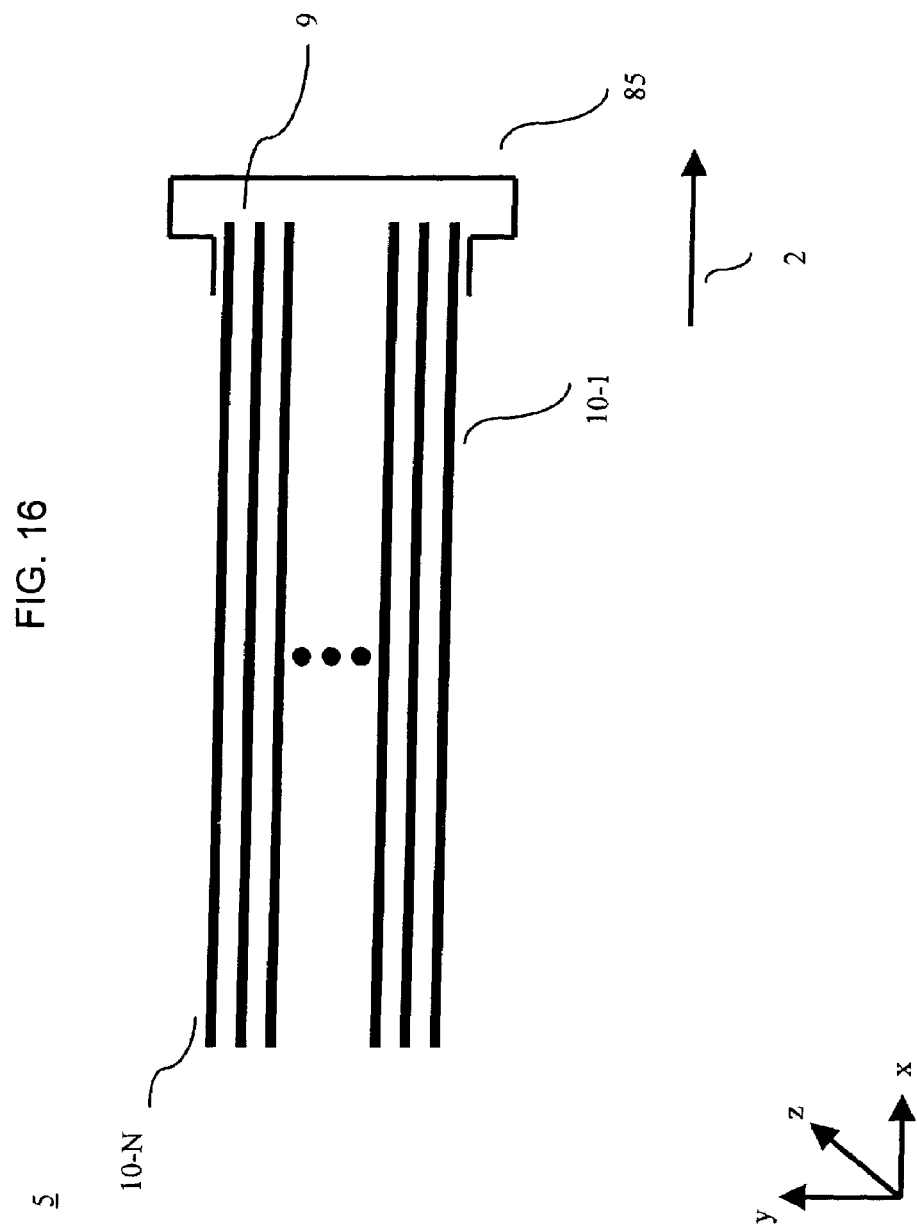

FIBER OPTIC BASED LIGHT ORNAMENT

BACKGROUND OF THE INVENTION

The invention relates generally to decorative lights and, more particularly, to fiber optic based decorative lights or ornaments.

Fiber optic Christmas trees are well known such as the one illustrated in U.S. Pat. No. 5,422,797 issued Jun. 6, 1995 to Shattan. In a fiber optic Christmas tree, individual optical fibers, or strands, are arranged on the tree to provide illumination. A light source is, e.g., located at the base of the tree. The light source can utilize a color-wheel, of one or more colors, so that the color of the light emitted by each strand changes over time.

Unfortunately, a portion of the consumer market does not care for fiber optic trees for the simple reason that they "lack light." In other words, the intensity of the light output from each of the strands of optical fiber is dimmer in comparison to a more conventional Christmas tree utilizing electric light bulbs for illumination.

However, electric light sets for use as decorative items on, e.g., a Christmas tree, are not without their own problems. For example, although one can typically change their blinking frequency—one cannot change the overall color pattern once the electric lights are on the Christmas tree. In addition, and of even more concern, is their reliability—an electric bulb may fail. Indeed, depending on the design of the light set, a single electric bulb failure may cause a number of other bulbs to stop working. In this case, repair is somewhat problematic as one must first locate the failed bulb, which can be time-consuming. In addition, if a failure occurs while the light set is on the Christmas tree—intermixed with garland and other ornaments—it may be very inconvenient and difficult to repair. As a result of the reliability issue, common sense dictates that a string of bulbs be tested beforehand—again a labor and time-consuming effort. Regardless, spending the time to test an electric bulb set before placement on the Christmas tree does not ensure a bulb will not fail once arranged on the Christmas tree.

In view of the above, further improvements in decorative lighting arrangements would be desirable.

SUMMARY OF THE INVENTION

One aspect of the invention provides a decorative light assembly comprising a plurality of optical fibers formed into a bundle having a length greater than one inch, the bundle having a first end for receiving light, and a second end that is fused for providing the received light as decorative illumination. The fusing of the individual optical fibers at the second end of the bundle results in a mixing, or combining, of the light from each of the individual strands. Thus, the overall illumination from the fused end is brighter than the light from an individual strand and is comparable, if not better than, the illumination from an electric light bulb. In addition, the reliability of such a decorative light assembly is better than that of an electric light bulb since there is no bulb to fail.

In an embodiment of the invention, an ornament such as a Christmas tree is decorated with a number of optical bundles, each optical bundle having a fused end and an un-fused end. The Christmas tree includes a light source for coupling light into the un-fused end. Illumination, or decorative lighting, of the Christmas tree is provided by the light emitted from the fused ends of the optical bundles.

In other embodiments of the invention, other ornaments, objects or items, are decorated with optical bundles having a fused end and an un-fused end such as, but not limited to, a wreaths, flowers, windows, doors, etc.

In another embodiment of the invention, a decorative light set for providing decorative lighting comprises a light source and number of optical bundles for coupling to the light source and wherein each optical bundle has a fused end.

In another embodiment of the invention, a method of manufacturing an optical bundle comprises the steps of collecting a plurality of optical fibers together to form an optical bundle; and heating at least one end of the optical bundle to fuse, or weld, the individual strands together.

In another aspect of the invention, the fused end of the optical bundle is formed into a shape. For example, one shape resembles an electric light bulb.

BRIEF DESCRIPTION OF THE DRAWINGS

FIGS. 1 and 2 show an illustrative embodiment of a decorative light assembly in accordance with the principles of the invention;

FIG. 16 shows another embodiment of a decorative light assembly in accordance with the principles of the invention.

DETAILED DESCRIPTION

Figure 1:
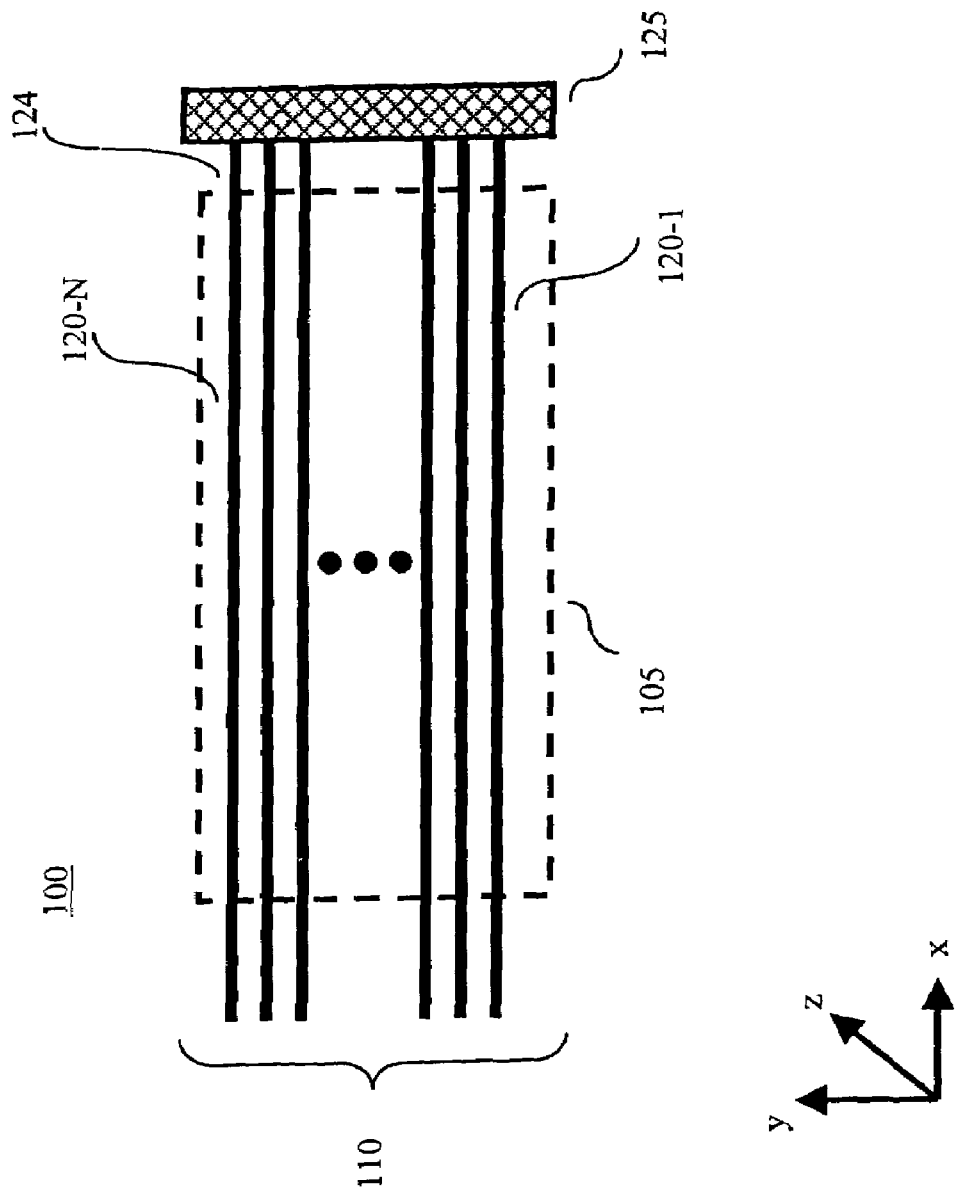

FIG. 1 shows a side view of a decorative light assembly in accordance with the principles of the invention. It should be noted that the illustrations shown in the FIGS. are not to scale and some illustrations, such as FIG. 1, have been exaggerated for purposes of description. In addition, other than the inventive concept, the elements shown in the figures are well known and will not be described in detail herein. Like numbers in each of the figures represent similar elements.

Optical bundle 100 comprises a number of optical fibers, or strands, 120-1 through 120-N. Each strand is represented by a thick black line. As known in the art, a strand comprises a cladding material (not shown) surrounding a core material (not shown), which provides the medium for light propagation. In accordance with the inventive concept, any type, size, and composition of optical fiber may be used. In fact, different types of optical fibers may be used in the same optical bundle. For the purposes of this example, the number of optical fibers in an optical bundle may be in the range of 12 to 15, each strand on the order of 4 to 7 mils (thousandths of an inch) in thickness. It should be noted that the inventive concept is not so limited. For example, any number of optical fibers, N ≧2, may be used and the thickness of an optical fiber can be less than 4 mils or greater than 7 mils. Indeed, some or all of the optical fibers in a bundle may even differ in thickness. Surrounding these strands is a covering, or sheath 105, represented by a dashed line. Sheath 105 can be, e.g., a colored tape, or paper wrapping. The color of sheath 105 may be selected to match the surroundings so as to hide, to an extent, the presence of optical bundle 100. For example, if optical bundle 100 is to be arranged on a green-colored Christmas tree, the color of sheath 105 may be green to match that of the tree. It should be noted that FIG. 1 is a two-dimensional representation of optical bundle 100 in an x-y plane. While optical bundle 100 may be in the form of a ribbon and the strands arranged in just the x-y plane, a preferred embodiment arranges the strands of optical bundle 100 in three dimensions, e.g., along the z-axis shown in FIG. 1.

As illustrated in FIG. 1, optical bundle 100 has two ends—strand end 110 and fused end 125. Strand end 110 comprises the individual optical fibers and illustratively extends beyond sheath 105. Strand end 110 is coupled to a light source (not shown). At the opposite end of optical bundle 100 is fused end 125. In fused end 125 each of the strands 120-1 to 120-N are, in accordance with the principles of the invention, fused, or melted together. This "fusing" of each of the strands is represented by the crosshatched area of fused end 125. The fusing of the individual optical fibers at the second end of optical bundle 100 results in a mixing, or combining, of the light from each of the individual strands. That is, the creation of a light combining region. Thus, the overall illumination from fused end 125 is brighter than the light from an individual strand (such as strand 120-1) and is comparable, if not better than, the illumination from an electric light bulb (not shown). In fact, the white light available from an optical bundle may be crisper, i.e., appear "whiter" than the white light available from a conventional electric bulb. In addition, the reliability of such a decorative light assembly is better than that of an electric light bulb since there is no bulb to fail. As shown in FIG. 1, there may be a gap 124 between the fused end 125 and sheath 105.

Turning now to FIG. 2, a front view of optical bundle 100 is shown. As illustrated in FIG. 2, optical bundle 100 extends in the z-axis and the strands 120-1 to 120-N are fused together. As can be observed from FIG. 2, optical bundle 100 comprises 14 strands (i.e., N=14). However, any number of fibers may be used in an optical bundle. Indeed, the amount of illumination from an optical bundle can be varied by having more or less strands, thinner or thicker strands, and/or combinations thereof.

Figure 3:
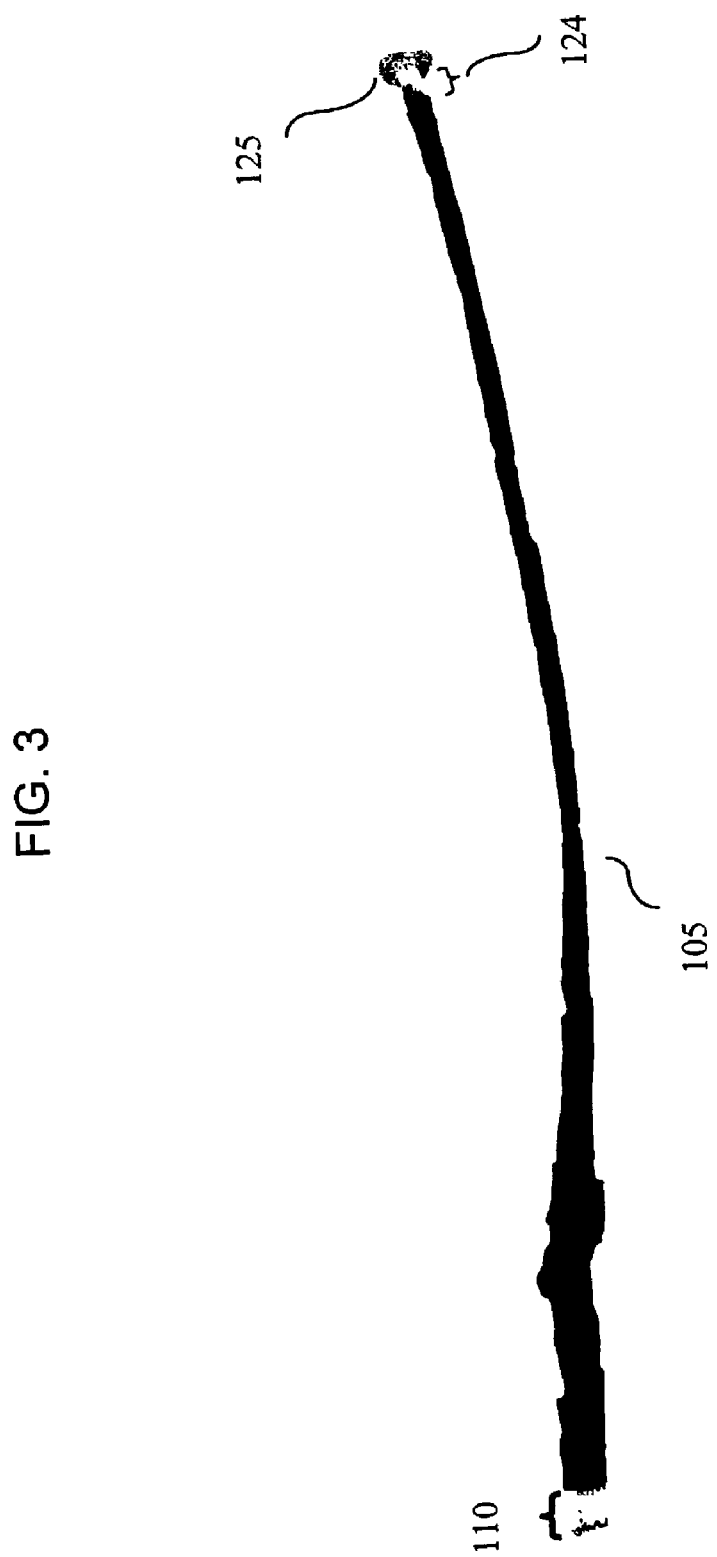
FIG. 3 shows an illustrative optical bundle in accordance with the principles of the invention.

An actual black and white image of an illustrative optical bundle in accordance with the principles of the invention is shown in FIG. 3.

Figure 4:
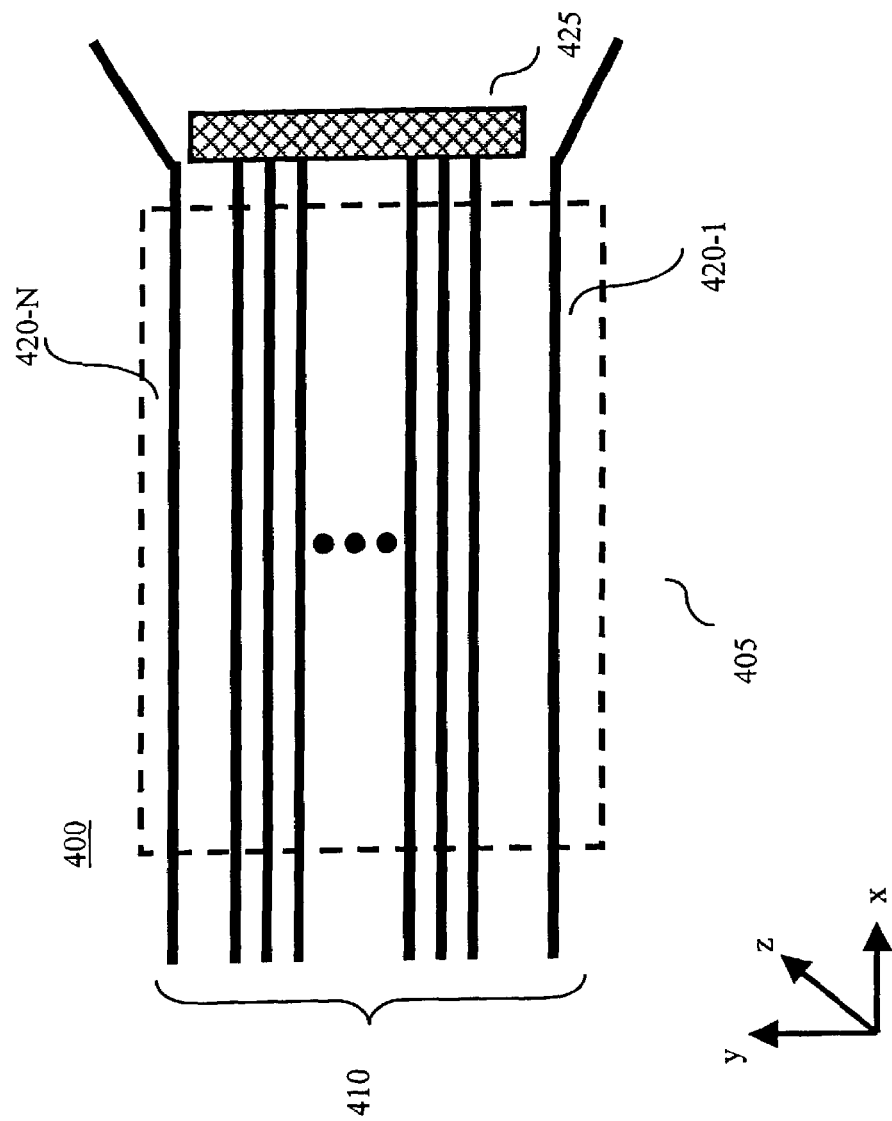
FIG. 4 shows another illustrative embodiment of a decorative light assembly in accordance with the principles of the invention.

Another illustrative embodiment is shown in FIG. 4. Optical bundle 400 is similar to optical bundle 100 of FIG. 1 except that one or more optical fibers are not a part of fused end 425. In this example, two fibers, 420-1 and 420-N, are not included in the plurality of optical fibers having fused end 425. It should be noted that it is not required that these single strands emit any light, and they may be merely for decoration around fused end 425.

Figure 5:
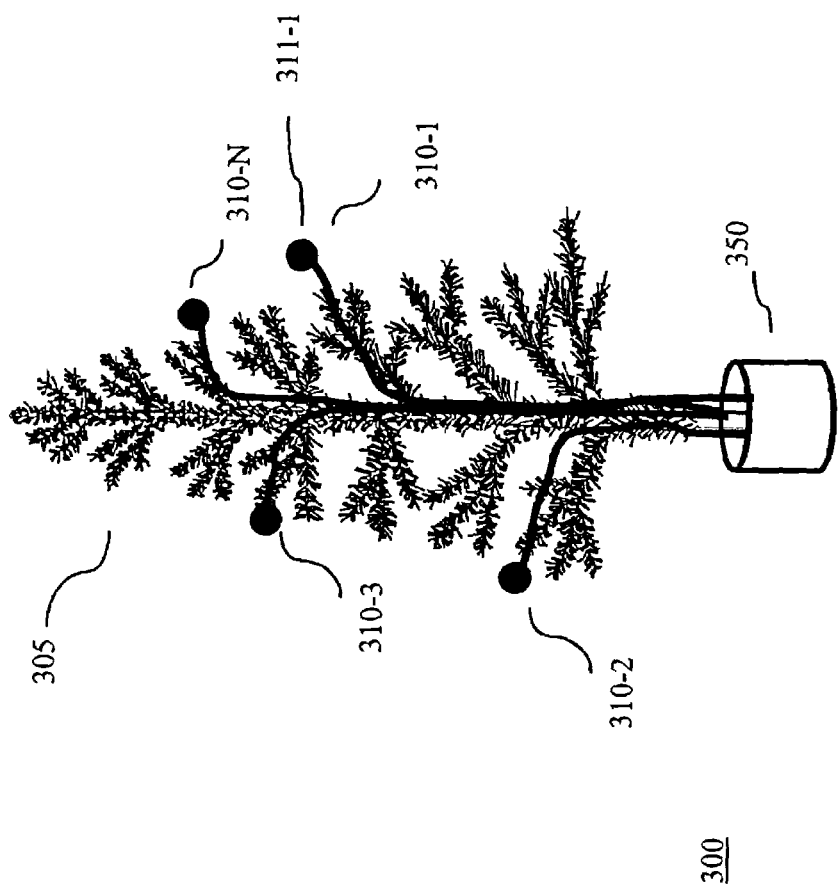
FIGS. 5–7 show illustrative Christmas trees in accordance with the principles of the invention.

Another illustrative embodiment is shown in FIG. 5. A Christmas tree 300 comprises a tree portion 305 supported by a light box 350. The latter serves as a light source and may include a color wheel comprising one, or more, colors. In accordance with one aspect of the invention, arranged on tree 300 are a number of optical bundles, N, as represented by optical bundles 310-1, 310-2, 310-3 and 310-N. Each optical bundle has a fused end, as represented by the enlarged ball shape (e.g., 311-1), and an un-fused end (not shown) disposed in light box 350. It should be noted that other ornaments, and even other light ornaments (e.g., electric bulbs, single strand fibers) may also be decorated on tree 300. The light source (not shown) of light box 350 provides light to the un-fused end of each optical bundle. The light is guided by each strand of an optical bundle towards the fused end. Upon reaching the fused end, the light from each strand combines to provide a level of illumination comparable to, if not brighter than, an electric bulb.

Figure 6:
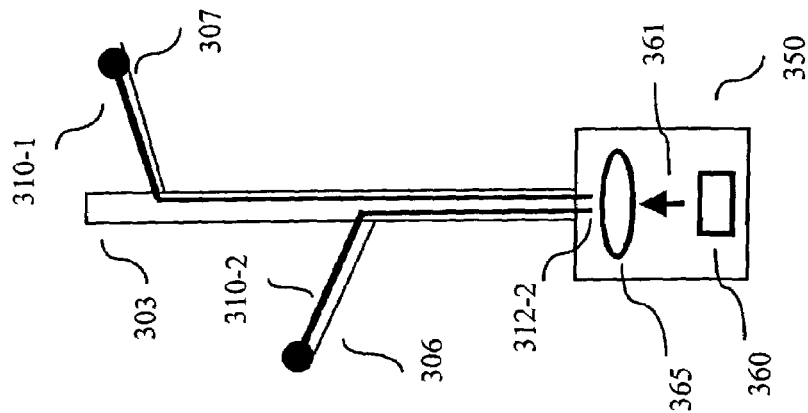

FIG. 6 illustrates another view of Christmas tree 300. The latter comprises a center post or metal pole 303, around which each optical bundle (as represented by optical bundles 310-1 and 310-2) is placed, weaved or wrapped. It should be noted that the optical bundles themselves may be further covered, or wrapped, to hide the presence of the optical bundles in the tree. The illustrative optical bundles of FIG. 6 are arranged along branches 306 and 307. Along each branch an optical bundle may be wrapped or attached via a clip (not shown). However, the arrangement of the optical bundles on the tree can be in any fashion. As illustrated in FIG. 6, the un-fused ends of each optical bundle, e.g., un-fused end 312-2, are disposed in light box 350. The latter comprises a light source 360 (e.g., a bulb), a power source (not shown) and, optionally, a color wheel 365. Light from light source 360 is emitted generally along the direction of arrow 361 to pass through color wheel 365 and then enter the un-fused ends of the N optical bundles as represented by un-fused end 312-2. The light is guided by each strand of an optical bundle towards the fused end, as described above.

Figure 7:
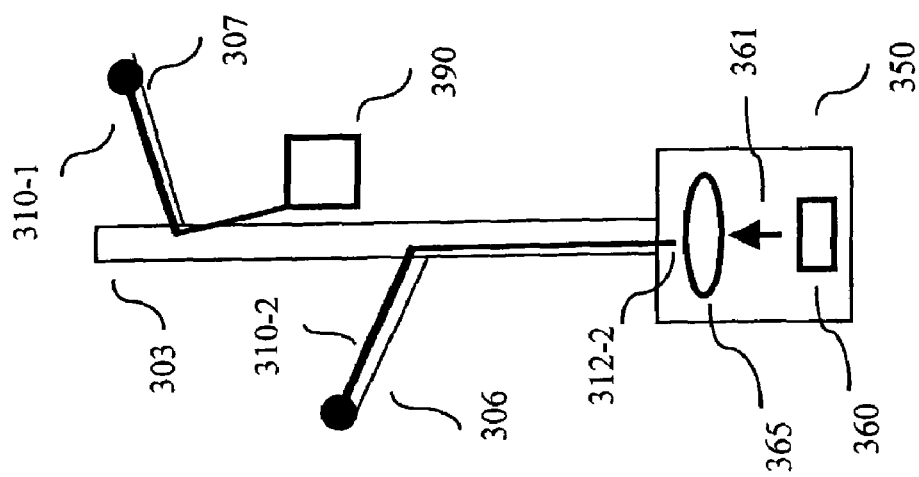

As noted above, any number of optical bundles may decorate a tree. The number will depend on the height of the tree and the intended decorative affect. For example, a tree with a height 8 feet may have on the order of 400 to 500 optical bundles as decoration. It can also have as few as one optical bundle. It should also be noted that a tree can come in one or more sections for ease of assembly. In addition, it can easily be observed from FIGS. 5 and 6 that optical bundles will come in different lengths. For example optical bundle 310-2 is shorter than optical bundle 310-1. Consequently, optical bundle 310-1 will attenuate the light more than optical bundle 310-2. This attenuation may become more noticeable in a taller tree (e.g., an 8 foot tree). As such, in taller trees it may be preferable to have multiple light boxes to compensate for this optical attenuation. For example, a bottom light box as illustrated in FIGS. 5 and 6 for providing light to optical bundles on, e.g., the lower half of the tree, and another light box arranged towards the top of the tree for providing light to the remaining optical bundles. This is illustrated in FIG. 7 where the length of optical bundle 310-1 has been shorted by coupling to light box 390 instead of light box 350. Light box 390 may be coupled to the tree in any fashion.

Figure 8:
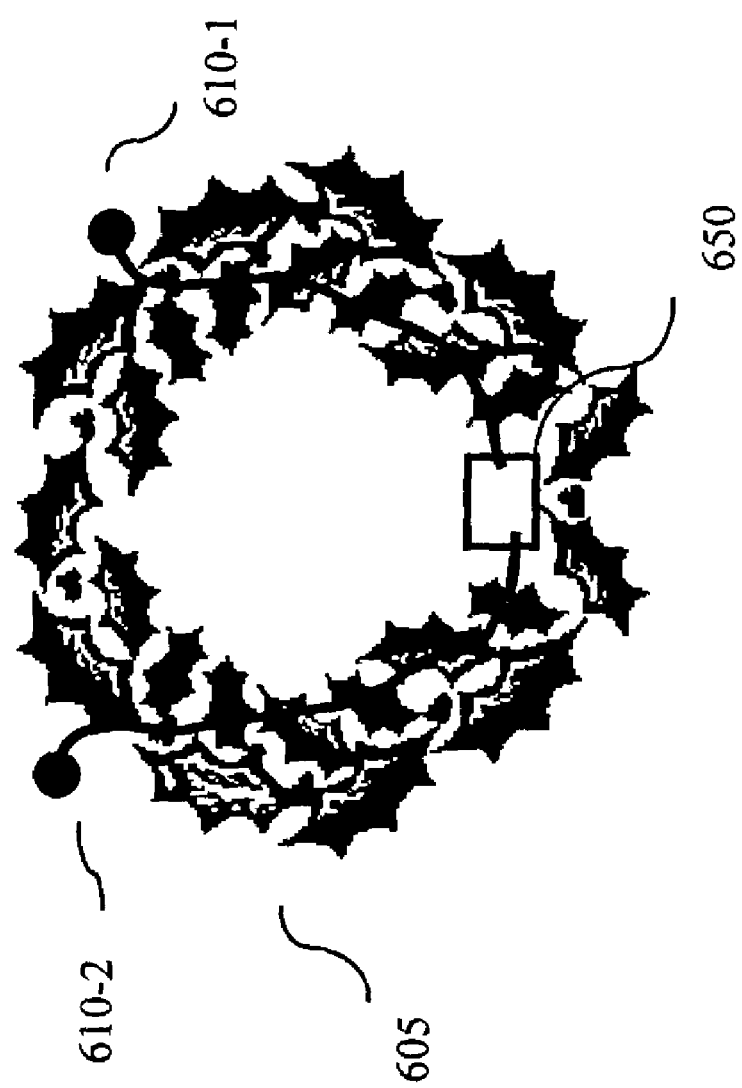
FIG. 8 shows an illustrative wreath in accordance with the principles of the invention.

Another embodiment in accordance with the principles of the invention is shown in FIG. 8. A wreath, or garland, 605 is decorated with one or more optical bundles, as represented by optical bundles 610-1 and 610-2, which are coupled to a light source 650.

Figure 9:
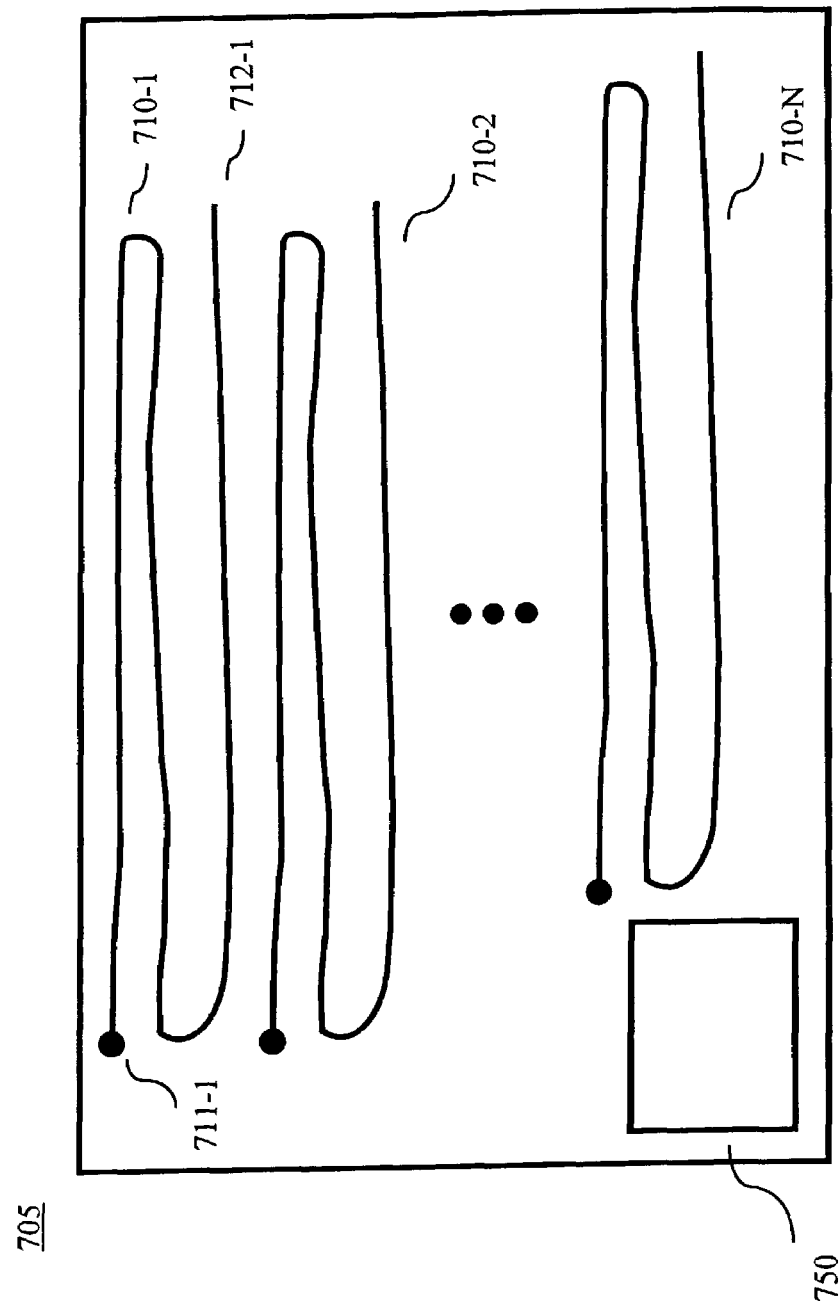
FIG. 9 shows an illustrative light set in accordance with the principles of the invention.

In accordance with another aspect of the invention, attention should be turned to FIG. 9, which illustrates another embodiment. A light set package 705 comprises a number of optical bundles, 710-1, 720-2 and 710-N. Each optical bundle has a fused end (e.g., fused end 711-1 of optical bundle 710-1) and an un-fused end (e.g., un-fused end 712-1 of optical bundle 710-1). Light set package 705 also includes a light source 750 for coupling to the un-fused ends of the optical bundles. Light source 750 is similar to the light box described above and includes, e.g., a bulb, optional color wheel and a power source (or means for coupling thereto). The optical bundles of light set package 705 may be of differing lengths.

Figure 10:
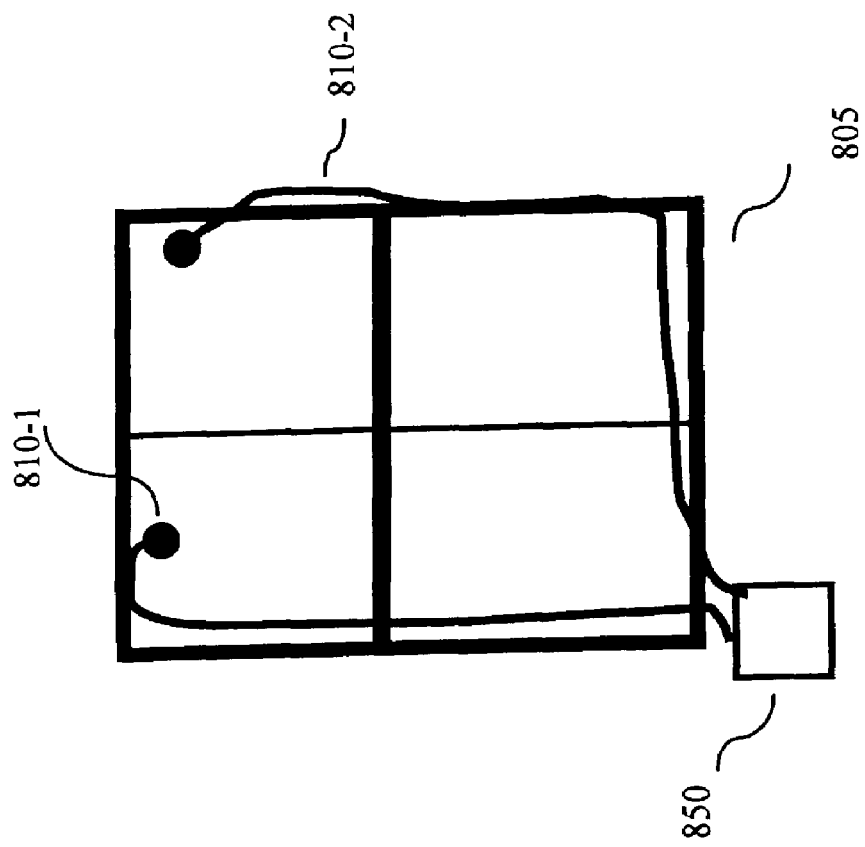
FIG. 10 shows an illustrative window in accordance with the principles of the invention.

Such a light set package can be used to decorate not only trees and wreaths, but also other items, an illustrative embodiment of which is shown in FIG. 10. In FIG. 10, a window 805 is decorated with one or more optical bundles as represented by optical bundles 810-1 and 810-2. The un-fused ends of the optical bundles are coupled to light source 850. The latter is similar to the light box described above and includes, e.g., a bulb, optional color wheel and a power source (or means for coupling thereto).

Figure 11:
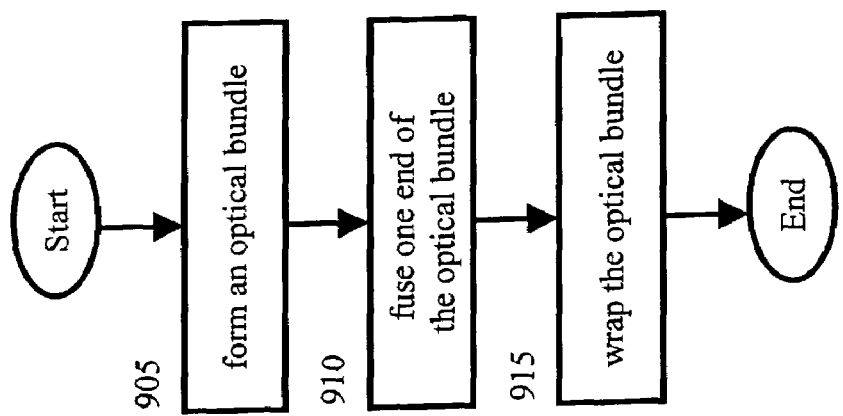
FIGS. 11–14 show an illustrative process for manufacturing a decorative light assembly in accordance with the principles of the invention.

An illustrative process for manufacturing an optical bundle in accordance with the principles of the invention is shown in FIG. 11. In step 905 a plurality of optical fibers or strands of approximately the same length are collected together to form a bundle. In step 910, at least one end of the optical bundle is fused together. In step 915, the optical bundle is wrapped. It should be noted that the optical bundle may be wrapped, e.g., in a sheath, before fusing. However, in such a case care should be taken with respect to that portion of the wrapping that is in close proximity—to what will be—the fused end of the optical bundle due to heat from the fusing, or melting, process.

Figure 12:
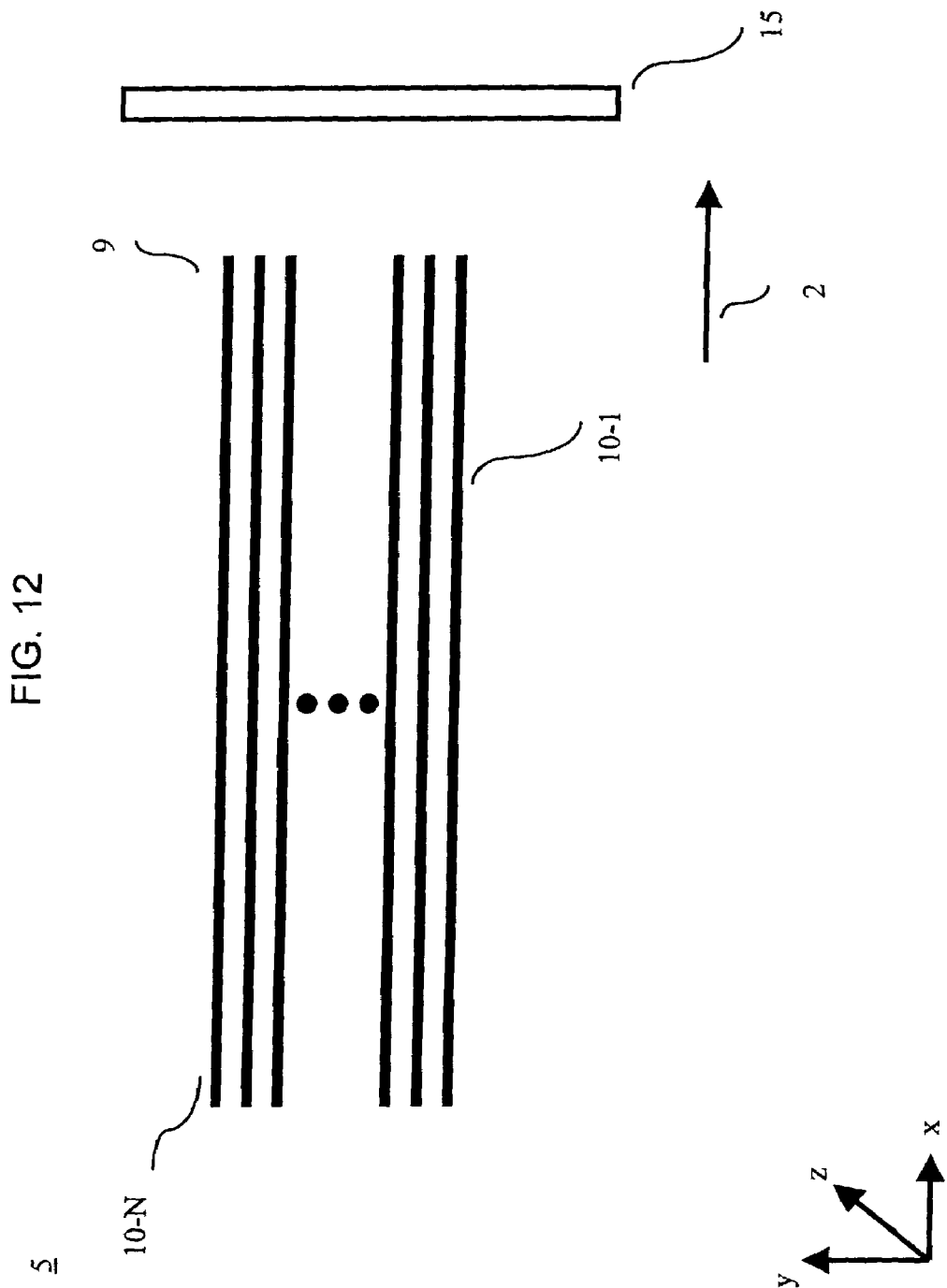
Figure 13:
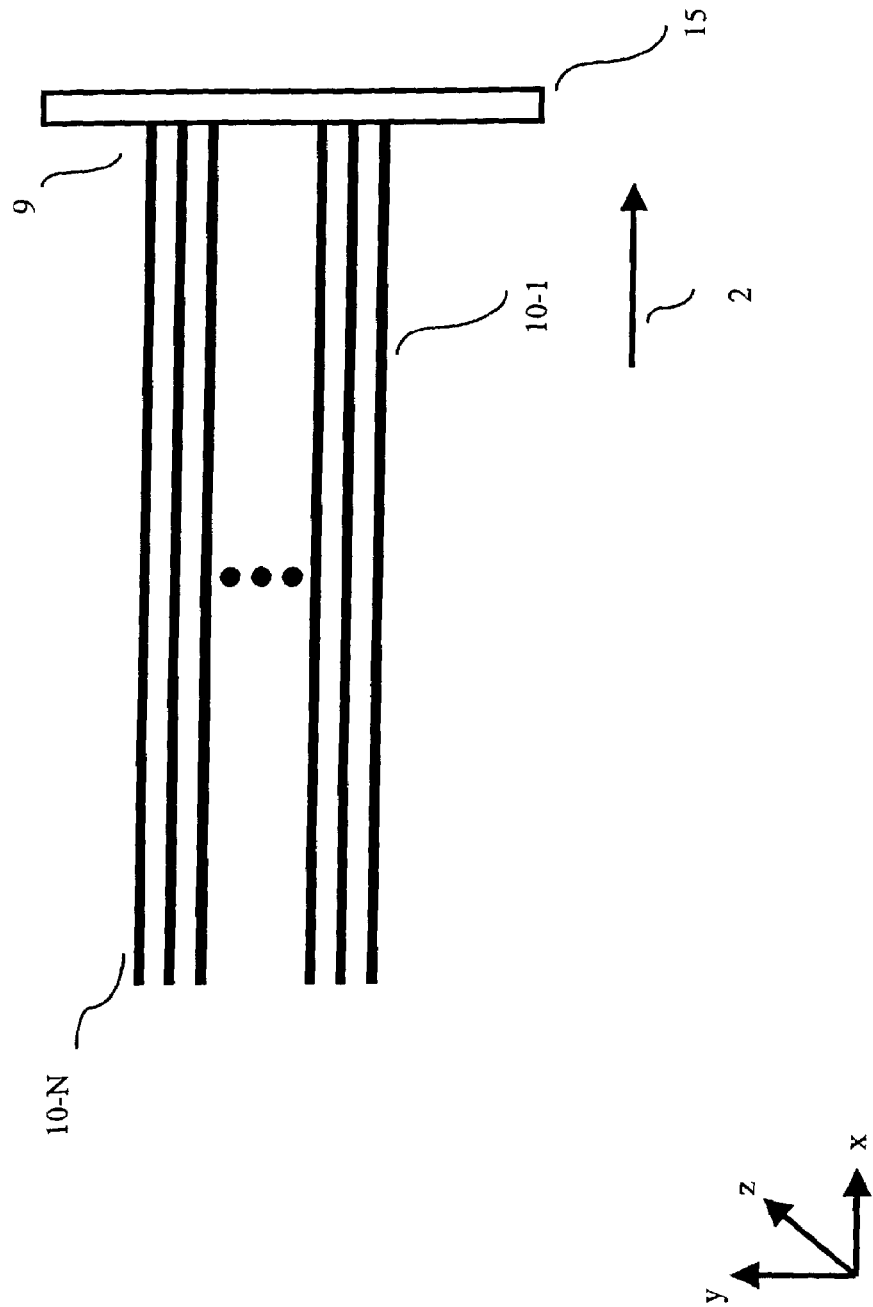
Figure 14:
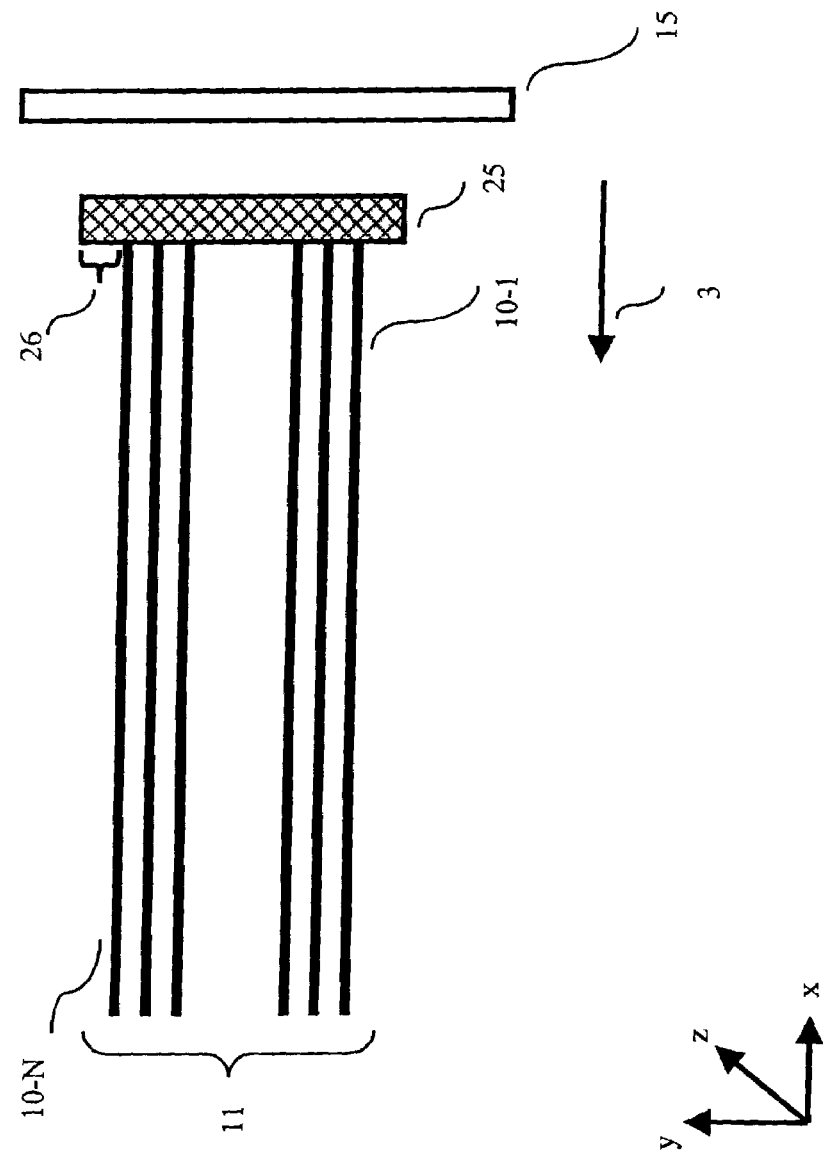

FIGS. 12–14 further illustrates step 910 of FIG. 11. Turning first to FIG. 12, as a result of step 905 of FIG. 11, an optical bundle 5 comprises a plurality of optical fibers, or strands, 10-1 to 10-N. Optical bundle 5 is moved in the direction of arrow 2 towards a hot plate 15 (e.g., a steel plate heated to a temperature suitable to fuse, or melt, the fibers) Turning now to FIG. 13, end 9 of optical bundle 5 is pressed against hot plate 15—thus melting or fusing that end of optical bundle 5. As shown in FIG. 14, after, e.g., 1/16 of an inch of the optical bundle has been fused, optical bundle 5 is removed from contacting the surface of hot plate 15. The resulting fused portion of optical bundle 5—fused end 25—may have a larger nominal size cross-section than the nominal size cross-section of the remainder of optical bundle 5. This is illustrated in FIG. 14 by the existence of flared portion 26 of fused end 25. Illustratively, the flared portion 26 is on the order of 1/16 of an inch. This flared portion may be removed, e.g., cut-off, or may be left as is to ease the manufacturing process. Indeed, the flared portion can also be increased in size (by continued melting of that end of the bundle).

Figure 15:
FIG. 15 shows an illustrative shape for use in manufacturing a decorative light assembly in accordance with the principles of the invention.

In another aspect of the invention, the fused end of the optical bundle is formed into a shape by, e.g., placing end 9 of optical bundle 5 of FIGS. 12–14 into a mold (not shown), which is then heated to fuse the strands therein into the particular shape. As end 9 of optical bundle 5 melts, optical bundle 5 is pressed into the mold until the mold is filled with melted material, at which point the process is terminated. Illustrative shapes may include, e.g., the shape of an electric light bulb as illustrated in FIG. 15 by mold 95. It should be noted that other methods of shaping the end may be used such as, but not limited to, filing, abrasion, etc.

Another embodiment of the invention is shown in FIG. 16. In this embodiment, a light combining region is formed—not by fusing or melting the individual strands—but by placement of the individual strands of end 9 of optical bundle 5 into a shaped cover 85, e.g., a bulb shell (e.g., the form of a bulb) or lens.

Although the invention herein has been described with reference to particular embodiments, it is to be understood that these embodiments are merely illustrative of the principles and applications of the present invention. For example, the optical bundles may also decorate other ornaments or items, e.g., doors, doorways etc., etc. It is therefore to be understood that numerous modifications may be made to the illustrative embodiments and that other arrangements may be devised without departing from the spirit and scope of the present invention as defined by the appended claims.

What is claimed is:

1. A decorative light assembly, comprising:
a plurality of optical fibers formed into a bundle, the bundle having a first end for receiving light, a second end for providing the received light as decorative illumination and a length greater than one inch; and
a light combining region for combining the received light from each of the plurality of optical fibers;
wherein the light combining region is formed from at least a portion of the bundle located at the second end.

2. The assembly of claim 1, further comprising at least one single strand of optical fiber that is not a part of the light combining region.

3. The assembly of claim 1, wherein the light combining region has a nominal size cross-section greater than a nominal size cross-section of the first end of the bundle.

4. The assembly of claim 1, wherein the light combining region includes a lens for receiving the second end.

5. The assembly of claim 1, wherein the light combining region includes a shaped cover for receiving the second end.

6. A decorative light assembly, comprising:
a plurality of optical fibers formed into a bundle, the bundle having a first end for receiving light, a second end for providing the received light as decorative illumination and a length greater than one inch;
wherein the first end includes ends of the plurality of optical fibers that are not fused together and the second end includes ends of the plurality of optical fibers that are fused together for combining the received light.

7. The assembly of claim 6, further comprising at least one single strand of optical fiber having a second end that is not fused to the ends of the plurality of optical fibers that are fused together.

8. The assembly of claim 6, wherein the second end of the bundle has a nominal size cross-section greater than a nominal size cross-section of the first end of the bundle.

* * * * *

UNITED STATES PATENT AND TRADEMARK OFFICE
CERTIFICATE OF CORRECTION

PATENT NO. : 6,979,111 B2  Page 1 of 1
DATED : December 27, 2005
INVENTOR(S) : Salvatore J. Puleo Sr. and Joseph A. Puleo It is certified that error appears in the above-identified patent and that said Letters Patent is hereby corrected as shown below:

<u>Column 5,</u>
Line 27, delete " ̄to" and insert -- to ̄ --.

Signed and Sealed this

Eleventh Day of April, 2006

JON W. DUDAS
*Director of the United States Patent and Trademark Office*

UNITED STATES PATENT AND TRADEMARK OFFICE
CERTIFICATE OF CORRECTION

PATENT NO. : 6,979,111 B2
APPLICATION NO. : 10/269821
DATED : December 27, 2005
INVENTOR(S) : Salvatore J. Puleo Sr. and Joseph A. Puleo It is certified that error appears in the above-identified patent and that said Letters Patent is hereby corrected as shown below:

<u>Column 5,</u>
Line 27, delete " to" and insert -- to— --.
Line 30, "illustrates" should read -- illustrate --.

This certificate supersedes Certificate of Correction issued April 11, 2006.

Signed and Sealed this

Fourteenth Day of November, 2006

JON W. DUDAS
*Director of the United States Patent and Trademark Office*